United States Patent
Harutyunyan et al.

(10) Patent No.: US 7,767,186 B2
(45) Date of Patent: Aug. 3, 2010

(54) METHOD FOR SELECTIVE ENRICHMENT OF CARBON NANOTUBES

(75) Inventors: Avetik Harutyunyan, Columbus, OH (US); Toshio Tokune, Dublin, CA (US)

(73) Assignee: Honda Motor Co., Ltd. (JP)

( * ) Notice: Subject to any disclaimer, the term of this patent is extended or adjusted under 35 U.S.C. 154(b) by 0 days.

(21) Appl. No.: 11/610,476

(22) Filed: Dec. 13, 2006

(65) Prior Publication Data
US 2007/0085460 A1 Apr. 19, 2007

Related U.S. Application Data

(63) Continuation of application No. 10/404,279, filed on Mar. 31, 2003, now Pat. No. 7,150,865.

(51) Int. Cl.
C09C 1/44 (2006.01)
(52) U.S. Cl. .................. 423/460; 423/461; 204/157.15; 204/157.43
(58) Field of Classification Search ............... 423/447.1, 423/447.2, 447.3, 460, 461; 204/158.2, 157.15, 204/157.43; 977/742, 751
See application file for complete search history.

(56) References Cited

U.S. PATENT DOCUMENTS 7,150,865 B2 * 12/2006 Harutyunyan et al. ....... 423/460
2003/0042128 A1 * 3/2003 Harutyunyan et al. .... 204/158.2

2004/0180244 A1 * 9/2004 Tour et al. ............... 429/13

OTHER PUBLICATIONS

Ester Vazquez, Microwave-assisted purification of HIPCO carbon nanotubes, Sep. 2002, The Royal Society of Chemistry, 2308-2309.*
Japanese Office Action, Japanese Patent Application No. 2006-507703, Apr. 6, 2010, 5 pages.
Harutyunyan, A. et al., Purification of Single-Wall Carbon Nanotubes by Selective Microwave Heating of Catalyst Particles, Journal of Physical Chemistry B, 2002, pp. 8671-8675, vol. 106, No. 34, 6 pages.

* cited by examiner

Primary Examiner—Stanley Silverman
Assistant Examiner—James Fiorito
(74) Attorney, Agent, or Firm—Fenwick & West LLP; Mark E. Duell

(57) ABSTRACT

A method for treating carbon nanotubes with microwave energy to selective remove metallic-type carbon nanotubes is provided. A sample containing carbon nanotubes is positioned in a microwave cavity at a location corresponding to a maximum in the electric field component of a stationary wave having a microwave frequency. The sample is exposed to the microwave energy for a sufficient period of time to increase the proportion of semiconducting-type carbon nanotubes within the sample. Alternatively, a sample consisting essentially of metallic-type and semiconducting-type carbon nanotubes is exposed to microwave energy for a sufficient period of time to increase the proportion of semiconducting-type carbon nanotubes within the sample.

9 Claims, 5 Drawing Sheets

METHOD FOR SELECTIVE ENRICHMENT OF CARBON NANOTUBES

CROSS-REFERENCE TO RELATED APPLICATIONS

This application is a continuation of and claims priority from U.S. Ser. No. 10/404,279, filed Mar. 31, 2003, issued as U.S. Pat. No. 7,150,865, and which is herein incorporated by reference in its entirety.

FIELD OF INVENTION

The present invention relates to a method for the preparation of carbon nanotubes.

BACKGROUND

Single-walled carbon nanotubes are a material with many potential industrial and research uses. Potential applications for carbon single-walled nanotubes (SWNTs) composed of carbon include such diverse areas as nanodevices, field emitters, improved capacitors, high strength composite materials, and hydrogen storage. Realizing the full potential of carbon nanotubes within these technologies, however, will require further study into the properties of carbon nanotubes. Some of the barriers to achieving this potential are due to limitations in current carbon nanotube synthesis methods.

The end product for many carbon nanotube synthesis techniques is a mixture of carbon nanotubes, amorphous carbon, and some type of metal particles used as a growth catalyst. The metal particles used for the growth catalyst are often metal nanoparticles composed of a ferromagnetic material such as iron, cobalt, or nickel. Additionally, the carbon nanotubes themselves are formed in a mixture of sizes and shapes. In particular, the desired carbon SWNTs are usually a mixture of carbon SWNTs with semiconducting-type properties and carbon SWNTs with metallic-type properties. The ratio of metallic type-nanotubes versus semiconducting-type nanotubes is controlled in part by the process used to synthesize the nanotubes.

Some previous work has focused on purifying carbon nanotube samples by removing the metal particles of the nanotube growth catalyst. Typically this is achieved by treating the nanotube sample with an acid, such as hydrochloric acid (HCl), nitric acid ($HNO_3$), or another mineral acid, that will dissolve the metal without causing substantial harm to the nanotubes. However, during a carbon nanotube synthesis process, an amorphous carbon shell can form around some of the metal particles. This amorphous carbon layer can prevent the acid from reaching the metal, thus preventing dissolution and removal of the metal particles from the nanotube sample.

One method for overcoming this problem is to treat a nanotube sample containing amorphous carbon, metal growth catalyst particles, and carbon nanotubes with microwave energy in an atmosphere containing oxygen. Exposing the nanotube sample containing carbon nanotubes, metal growth catalyst particles, and amorphous carbon to microwave energy will result in heating of the sample. The primary source of heating in this situation is heating of the metal particles in the growth catalyst due to interaction of the metal particles with the magnetic field component of the microwave energy. As the metal particles increase in temperature, heat is transferred to the surrounding portions of the nanotube sample, including any amorphous carbon that has formed a shell around portions of the metal growth catalyst. If the sample is heated sufficiently the amorphous carbon becomes susceptible to oxidation, resulting in removal of the carbon as a gas phase product (such as CO or $CO_2$) or sufficient cracking of the amorphous carbon layer to allow acids to dissolve the metal particles. Typically the treatment conditions are selected to raise the temperature of the nanotube sample to a temperature where the amorphous carbon is damaged or removed without causing significant damage to the carbon nanotubes.

While the above technique provides a method for removing metal particles from a carbon nanotube sample, the resulting sample will still contain a mixture of carbon nanotubes with metallic-type and semiconducting-type properties. The next desirable purification step would be to further enrich a nanotube sample in a single type of nanotubes. For example, semiconducting-type carbon nanotubes exhibit luminescent properties. As a result, semiconducting-type carbon nanotubes potentially could be used in a variety of technologies that could benefit from improved luminescent materials, such as computer displays. In carbon nanotube samples containing both metallic-type and semiconducting-type nanotubes, samples with higher relative proportions of semiconducting-type nanotubes exhibit stronger luminescence. Thus, what is needed is a method for selectively removing metallic-type carbon nanotubes without affecting the semiconducting-type nanotubes in a nanotube sample.

SUMMARY

The present invention provides a method for increasing the proportion of semiconducting-type nanotubes in a carbon nanotube sample. In an embodiment, a microwave cavity is configured to produce a stationary wave at a desired microwave frequency. A carbon nanotube sample containing both semiconducting-type and metallic-type carbon nanotubes is placed in the cavity at a location corresponding to a maximum in the electric field component of a stationary wave of a microwave frequency. The carbon nanotube sample is then exposed to the stationary wave at the desired microwave frequency. The carbon nanotube sample is exposed for a sufficient period of time to destroy or damage carbon nanotubes with metallic-type properties while causing minimal or no damage to carbon nanotubes with semiconducting-type properties.

The present invention also provides a method for increasing the proportion of semiconducting-type nanotubes in a carbon nanotube sample that does not contain additional ferromagnetic or conductive materials. In an embodiment, a carbon nanotube sample consisting essentially of semiconducting-type and metallic-type carbon nanotubes is placed in a microwave cavity. The carbon nanotube sample is then exposed to microwave energy for a sufficient period of time to destroy carbon nanotubes with metallic properties while causing minimal or no damage to carbon nanotubes with semiconducting properties.

DETAILED DESCRIPTION OF THE EMBODIMENTS

Figure 1:
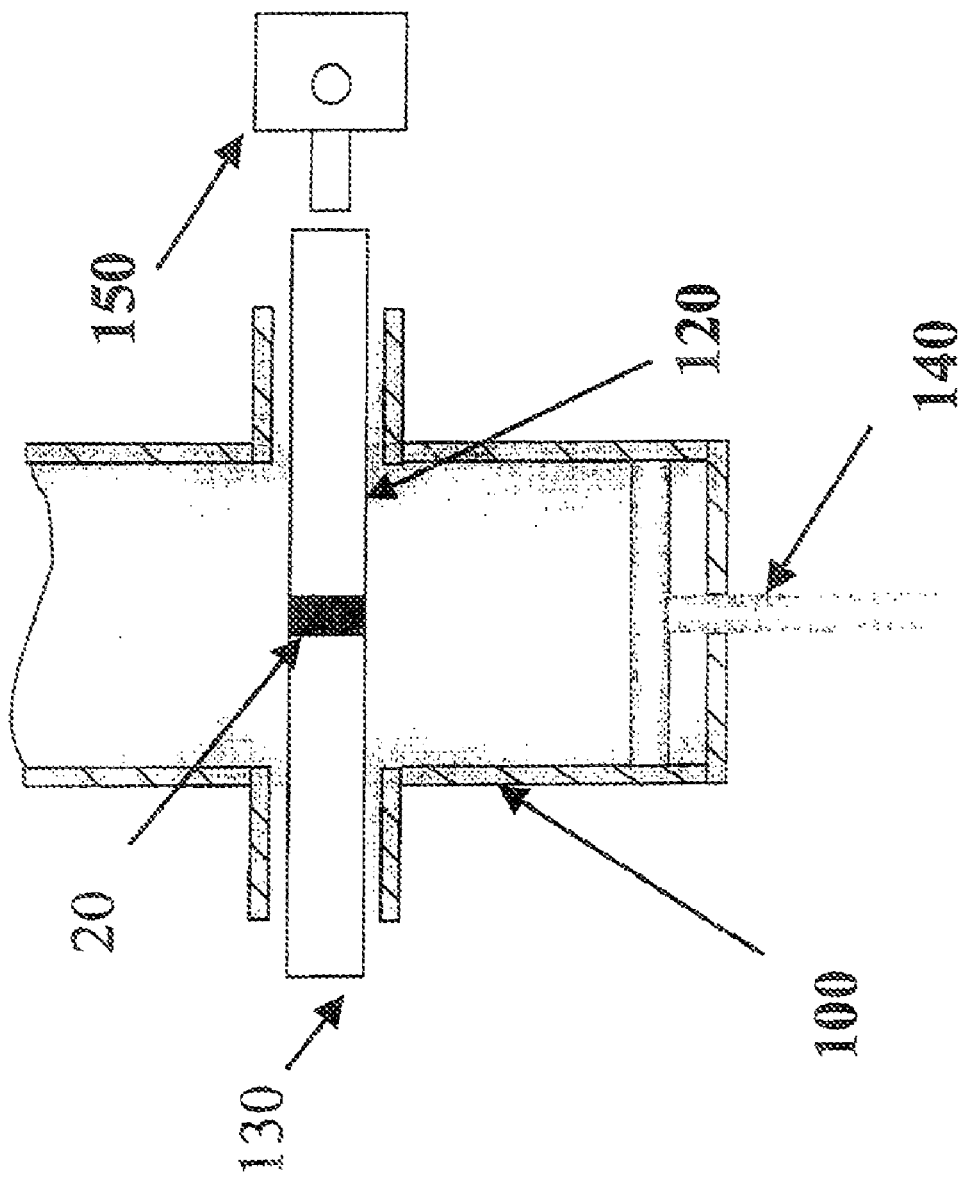
FIG. 1 depicts an apparatus for carrying out an embodiment of the present invention.

Embodiments of the present invention are now described with reference to the accompanying figures, where like reference numerals indicate identical or functionally similar elements. Also in the figures, the left most digit of each reference numeral corresponds to the figure in which the reference numeral is first used.

FIG. 1 depicts an apparatus suitable for exposing a carbon nanotube sample to microwave energy according to an embodiment of the present invention. A carbon nanotube sample 20 is placed inside microwave cavity 100. Any conventional microwave cavity capable of supporting a standing wave can be used. In an embodiment, microwave cavity 100 is a tunable $TE_{103}$ single mode cavity. Microwave cavity 100 includes a microwave source (not shown) for generating microwave energy of a desired frequency. Suitable microwave sources are available from Toshiba Corp. of Tokyo, Japan. In an embodiment, the microwave source is a 2.45 GHz source capable of a maximum power of 1.2 kilowatts.

In an embodiment, a carbon nanotube sample 20 is inserted into microwave cavity 100 by placing the sample 20 in a quartz boat (not shown) or other treatment vessel that can be inserted into quartz tube 120. In an embodiment, the position of nanotube sample 20 can be adjusted by changing the location of the treatment vessel. In another embodiment, the sample position may be changed by adjusting the position of quartz tube 120. Dry air and argon are introduced into microwave cavity 100 and quartz tube 120 via inlet 130. The temperature of a carbon sample 20 may be measured using an infrared optical pyrometer 150, such as the Mikron M90BT available from Mikron, Inc. of Oakland, N.J.

In an embodiment, microwave cavity 100 includes cavity tuning wall 140 for adjusting the resonance properties of the cavity. The position of cavity tuning wall 140 determines what frequencies can produce a stationary wave (or standing wave) within the microwave cavity 100 as well as the locations of maxima and minima of the electric and magnetic field components of the stationary wave.

Figure 2:
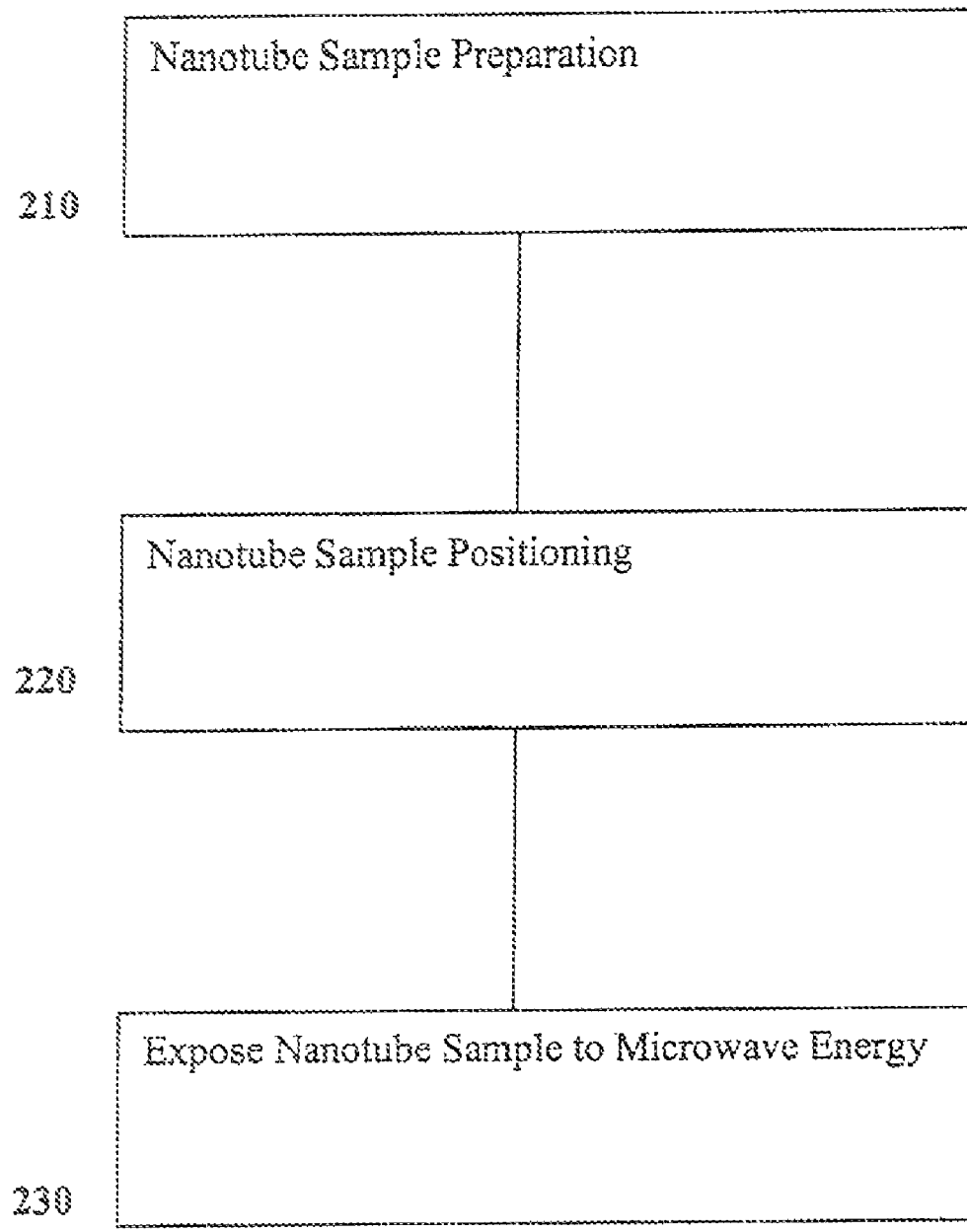
FIG. 2 depicts a method for increasing the proportion of semiconducting nanotubes in a carbon nanotube sample according to an embodiment of the present invention.

FIG. 2 depicts a flow chart for a method of treating carbon nanotubes according to an embodiment of the present invention. The method begins with nanotube sample preparation 210. In an embodiment, the nanotube sample is prepared by synthesizing carbon nanotubes via any suitable method, such as chemical vapor deposition (CVD) growth or laser vaporization. The sample is then placed in a treatment vessel, such as a quartz boat, for insertion into the microwave cavity. In another embodiment, nanotube sample preparation 210 comprises obtaining a nanotube sample and placing or receiving the nanotube sample into a treatment vessel. In still another embodiment, nanotube sample preparation 210 comprises placing a nanotube sample directly into quartz tube 120 for insertion into a microwave cavity. In yet another embodiment, nanotube sample preparation 210 comprises placing a plurality of nanotube samples in treatment vessels for insertion into a microwave cavity.

In an embodiment, the prepared nanotube sample is composed of a mixture of metallic-type carbon SWNTs and semiconducting-type carbon SWNTs. The nanotube sample may be of any size that is convenient for processing within the microwave cavity. In an embodiment, the prepared nanotube sample weighs approximately 100 mg. In another embodiment, the prepared nanotube sample weighs between about 10 milligrams and 10 grams.

In an embodiment, the prepared carbon nanotube sample can contain additional materials formed during synthesis of the carbon nanotubes, such as amorphous carbon created as a reaction byproduct during synthesis of carbon nanotubes by CVD or laser vaporization. In another embodiment, the prepared nanotube sample can contain materials added to facilitate carbon nanotube synthesis, such as metal nanoparticles used as a growth catalyst. In still another embodiment, the prepared carbon nanotube sample may contain low levels of additional materials, such as trace levels of metals or other impurities.

In another embodiment, nanotube sample preparation 210 optionally includes treating the nanotube sample to remove additional conductive or ferromagnetic materials. For example, in an embodiment where the carbon nanotube samples includes carbon nanotubes synthesized by CVD growth on a growth catalyst composed of metal nanoparticles, nanotube sample preparation 210 optionally includes treating the nanotube sample with an acid to remove the metal nanoparticles. Note that the goal of this optional treatment is to remove additional conductive or ferromagnetic materials that are present in sufficient amount to interact with microwave energy and produce significant heating. Trace levels of metals or other impurities that cannot produce significant heating during exposure to the microwave energy do not pose this concern.

In an embodiment, after preparation of the carbon nanotube sample, the carbon nanotube sample is positioned 220 within a microwave cavity. In an embodiment, the prepared carbon nanotube sample is positioned at a location corresponding to a maximum in the electric field for a stationary wave of a desired frequency. In a microwave cavity or other type of resonance chamber, the chamber may be tuned to produce a stationary wave at a particular frequency. Once a stationary wave is established, the amplitudes of the electric and magnetic fields will not vary as a function of location. Thus, any maxima and minima in the electric and magnetic fields will occur at fixed locations within the chamber.

Figure 3:
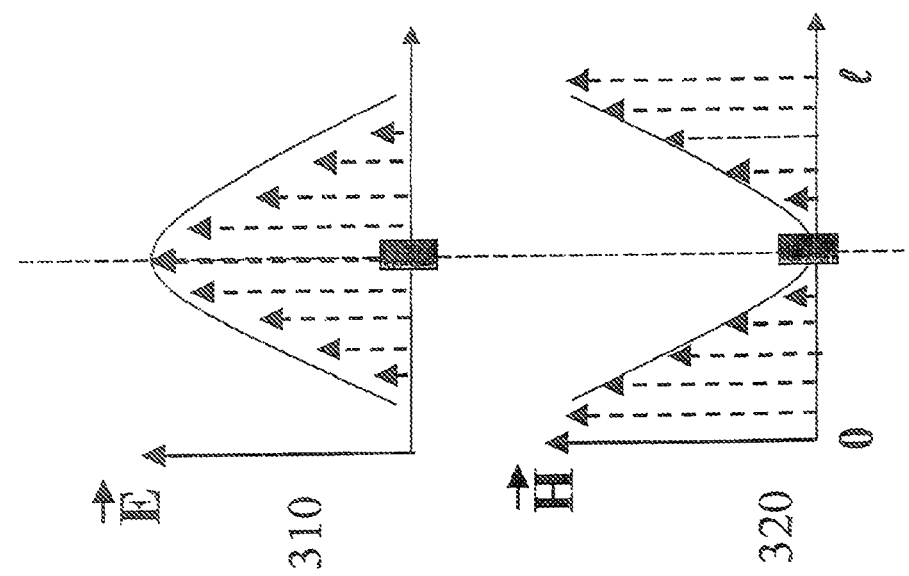
FIG. 3 depicts an example of the variation of the electric and magnetic fields within a microwave chamber configured according to an embodiment of the present invention.
Figure 3:
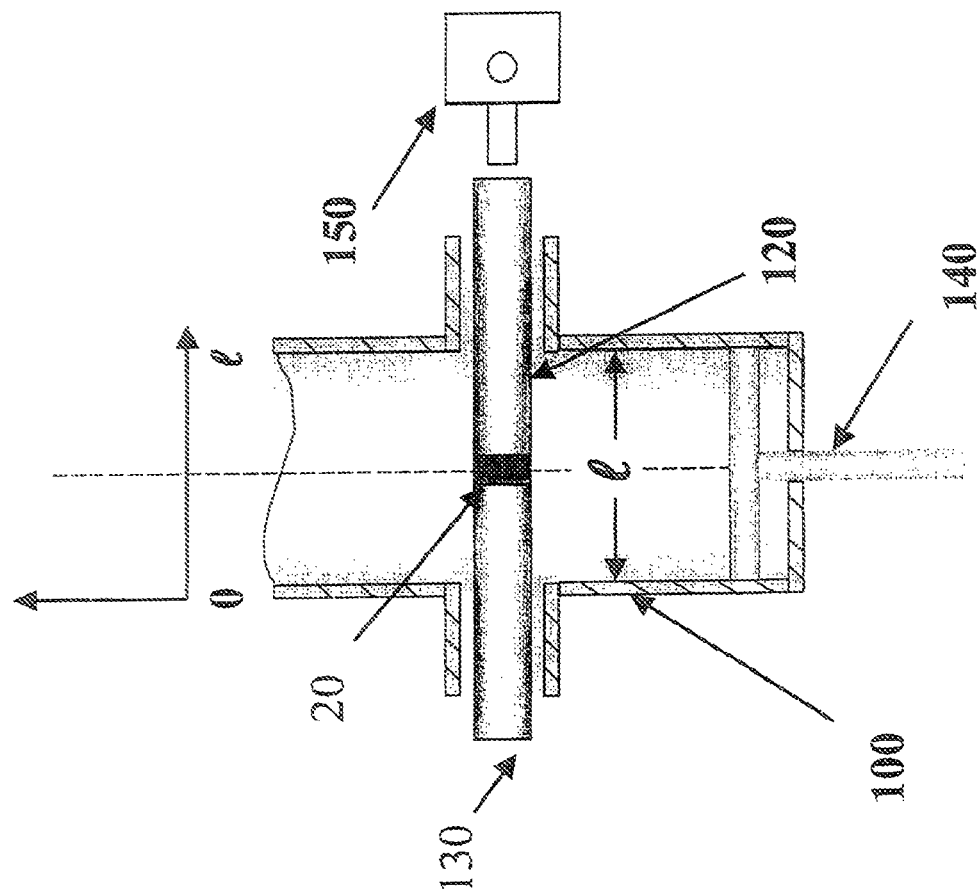

FIG. 3 depicts an example of the electric and magnetic field amplitudes for a stationary wave in a microwave cavity 100 according to an embodiment of the invention. Microwave cavity has a length 'L' along the propagation axis of the stationary wave. Plots 310 and 320 show the variation in the electric and magnetic fields for the stationary wave as a function of distance along the propagation axis. In this embodiment, plot 310 shows that the electric field is at a maximum in the center of the chamber while plot 320 shows a corresponding minimum for the magnetic field vector. Those skilled in the art will recognize that stationary waves with other patterns of maxima and minima may be constructed by varying such factors as the frequency of the electromagnetic wave or the size and shape of the chamber. These variations can be used to create stationary waves of a desired microwave frequency that have maxima in the electric field amplitude in one or more convenient locations within a microwave cavity.

In an embodiment, positioning 220 comprises placing a prepared nanotube sample in a location corresponding to a maximum in the electric field amplitude for a stationary wave of a desired frequency. In an embodiment, positioning 220 comprises placing a prepared nanotube sample at a maximum in the electric field amplitude that occurs in the center of a microwave cavity. In another embodiment, positioning 220 comprises placing a plurality of prepared nanotube samples at positions within a microwave cavity corresponding to a series of maxima in the electric field amplitude of a stationary wave. Other embodiments will be apparent to those of skill in the art.

After positioning 220 the nanotube sample, the nanotube sample is exposed to microwave energy 230 at a selected frequency. In an embodiment, the selected frequency is 2.45 gigahertz (GHZ). In other embodiments, any microwave frequency can be selected. In an embodiment, exposing a nanotube sample to microwave energy 230 comprises exposing a 100 g nanotube sample to a 2.45 GHz stationary wave with a power of 150 watts while flowing dry air through the microwave cavity at 100 standard cubic centimeters (sccm). This results in heating of the nanotube sample to a temperature of 500° C. as measured by a pyrometer. In an embodiment, the nanotubes are exposed to a maximum in the electric field component of the standing wave for 20 minutes.

The amount of power used during exposure of a nanotube sample to microwave energy depends on the size of the nanotube sample. In an embodiment, the nanotube sample is heated to a temperature of 500° C., as measured by a pyrometer. In another embodiment, the nanotube sample is heated to a temperature between about 450° C. and about 600° C. Those skilled in the art will recognize that the amount of power required to achieve a temperature will depend on the mass of the nanotube sample. In an embodiment, the power supply for the microwave source has a power of 150 watts. In another embodiment, the power supply is a variable power supply allowing for selection of a power between about 100 watts and about 300 watts. In still another embodiment, the power supply is a variable power supply allowing for selection of a power between about 50 watts and about 2 kilowatts. Note that it is generally preferred to maintain the temperature of the nanotube sample below 600° C. to prevent excessive damage to the semiconducting-type nanotubes.

In an alternative embodiment, positioning 220 comprises placing a prepared nanotube sample consisting of semiconducting-type and metallic-type nanotubes in a microwave cavity that is not configured to produce a stationary wave at the desired frequency of operation. In other words, in this alternative embodiment the microwave cavity is configured to operate in a manner similar to a conventional microwave oven or microwave digestion system. When additional conductive or ferromagnetic materials are not present in a nanotube sample, the interaction of the metallic-type nanotubes with the electric field component of the microwave energy is the primary method of heating the sample. Thus, general microwave energy is capable of selectively heating the metallic-type nanotubes and creating the necessary heating differential to damage or destroy the metallic-type nanotubes while minimizing damage to the semiconducting-type nanotubes.

In this alternative embodiment, positioning 220 comprises placing a prepared carbon nanotube sample generally within the microwave cavity. After positioning 220, the nanotube sample is exposed to microwave energy 230. In an embodiment, the nanotube sample is exposed to 150 watt microwave energy at 2.45 GHz for 20 minutes.

In an embodiment about 100 sccm of dry air is flowed through the microwave cavity during exposure of the nanotube sample to microwave energy. In another embodiment, the flow rate of dry air through the microwave cavity is between about 50 sccm and about 200 sccm. In still another embodiment, the dry air flowing through the microwave cavity may be mixed with another inert gas, such as argon.

Without being bound by any particular theory, it is believed that the carbon nanotubes with metallic-type properties couple more effectively with the electric field component during exposure to microwave energy and thus are selectively heated relative to semiconducting-type carbon nanotubes. Positioning a carbon nanotube sample at a maximum in the electric field amplitude maximizes this effect. Note that the temperature measurements mentioned above using a pyrometer represent an average temperature for the nanotube sample. Because only carbon nanotubes with metallic-type character couple strongly with the electric field component of the microwave energy, the metallic-type nanotubes experience a higher effective temperature. This selective heating of the metallic-type nanotubes subjects the metallic-type nanotubes to a higher effective temperature that facilitates oxidation or other destruction mechanisms, while the semiconducting-type nanotubes remain at a lower temperature where oxidation is less likely.

The above mechanism is in contrast to the situation where a carbon nanotube sample that also contains metal particles is subjected to general microwave energy. It is believed that the interaction of metal particles (or other ferromagnetic materials) with the magnetic field component of the microwave energy results in much faster heating of the nanotube sample than heating due to interaction of any conductive materials with the electric field component. As a result, it is believed that nanotube samples containing metal particles are primarily heated due to microwave energy interacting with the metal particles. Because the metal particles are likely to be randomly distributed in a nanotube sample relative to the positions of the metallic-type and semiconducting-type nanotubes, any heating from microwave interaction with the metal particles will equally affect all nanotubes within the sample. Note that any metallic-type nanotubes will still undergo some selective heating due to interaction with the electric field component of the microwave energy. However, when metal particles are present the temperature difference between the metallic-type and semiconducting-type nanotubes will be smaller due to general heating from the metal particles. As a result, it is difficult to selectively damage or destroy the metallic-type nanotubes without also causing significant damage to the semiconducting-type nanotubes.

The above problems are mitigated by placing a nanotube sample containing metal particles at a location corresponding to a maximum in the electric field component of a stationary wave of microwave energy. Such a location will also correspond to a minimum in the magnetic field component. At this location, heating due to interaction of the metal particles with the magnetic field component of the microwave energy will be minimized. The metal particles, however, are also conductive and will interact with the electric field component of the microwave energy, resulting in general heating of the carbon nanotube sample. This general heating due to the presence of the metal particles will reduce the temperature differential between the metallic-type and semiconducting-type nanotubes. However, by placing the nanotube sample at a maximum in the electric field component of the microwave energy (and thus a minimum in the magnetic field), the general heating will be greatly reduced, making it feasible to selectively damage the metallic-type nanotubes while maintaining the overall temperature of the nanotube sample at a low enough temperature to minimize damage to the semiconducting-type nanotubes.

Figure 4:
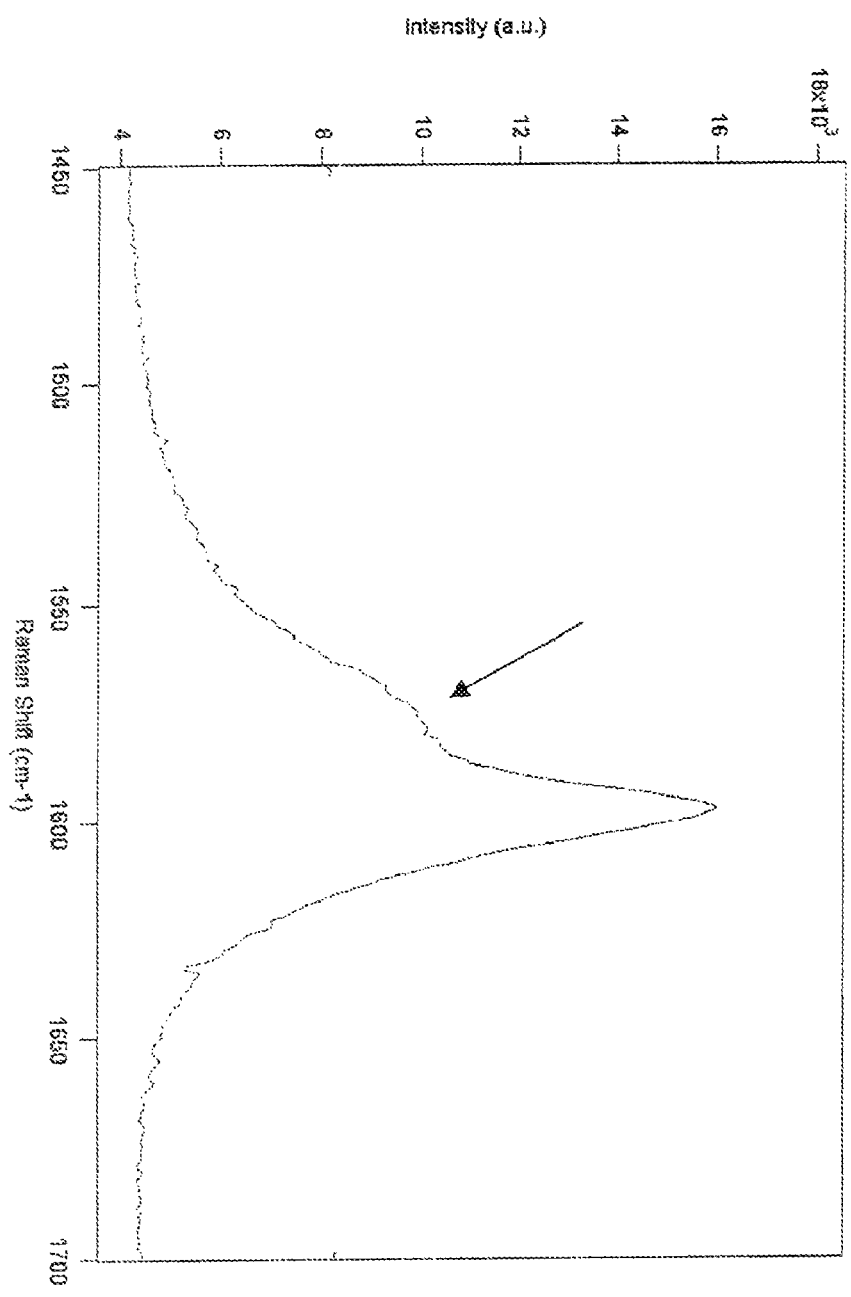
FIG. 4 depicts a Raman spectra of a carbon nanotube sample.
Figure 5:
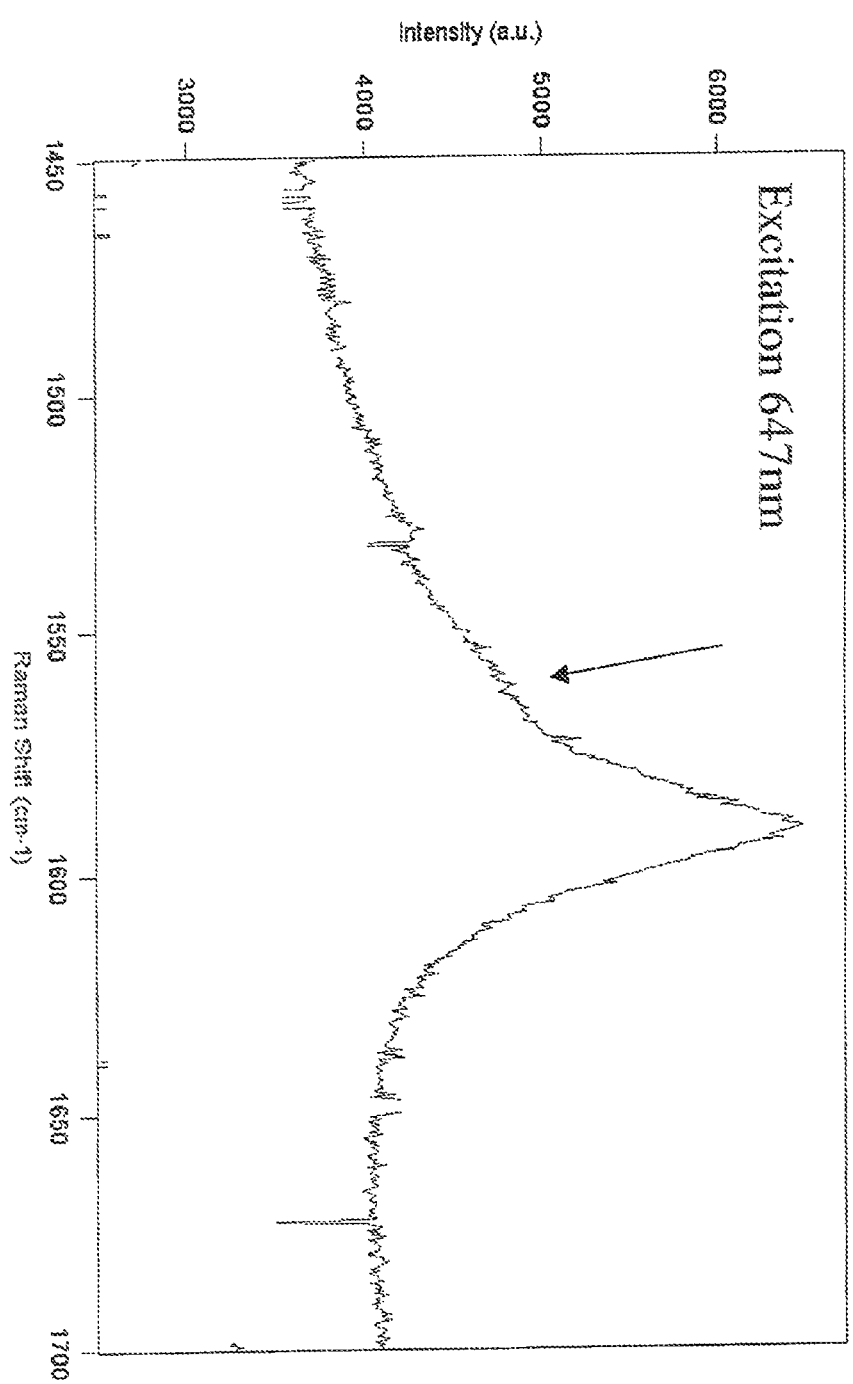
FIG. 5 depicts a Raman spectra of a carbon nanotube sample after processing according to an embodiment of the present invention.

After exposing a nanotube sample to microwave energy, the status of the remaining carbon nanotubes in the sample can be verified by several methods. Transmission electron microscopy can be used to verify that undamaged nanotubes are still present in the sample. As for the selective destruction of only metallic type nanotubes, Raman spectroscopy can be used to detect changes in the relative ratio of metallic-type and semiconducting-type nanotubes. FIGS. 4 and 5 provide Raman scattering data for carbon nanotube samples. FIG. 4 depicts Raman scattering data at 647 nm for a carbon nanotube sample prior to exposing the sample to microwave energy. The feature in the scattering spectrum marked with the arrow indicates a spectral feature due to the presence of metallictype nanotubes. FIG. 5 depicts Raman scattering data for the same carbon nanotube sample after exposure to microwave energy according to an embodiment of the present invention. The feature highlighted in FIG. 4 is now missing, indicating a reduction in the number of metallic-type carbon nanotubes.

While the invention has been particularly shown and described with reference to a preferred embodiment and various alternate embodiments, it will be understood by persons skilled in the relevant art that various changes in form and details can be made therein without departing from the spirit and scope of the invention.

We claim:

1. A method for processing carbon nanotubes comprising:
   receiving a carbon nanotube sample consisting essentially of metallic-type and semiconducting-type carbon nanotubes;
   positioning said carbon nanotube sample in a microwave cavity at a location corresponding to a maximum in the electric field of a stationary wave having a first microwave frequency and a first power; and
   exposing said carbon nanotube sample to the stationary wave.

2. The method of claim 1, further comprising:
   preparing said carbon nanotube sample consisting essentially of metallic-type and semiconducting-type carbon nanotubes.

3. The method of claim 2, wherein preparing said carbon nanotube sample consisting essentially of metallic-type and semiconducting-type nanotubes comprises:
   obtaining a carbon nanotube sample containing metallic-type and semiconducting-type carbon nanotubes; and
   treating said carbon nanotube sample to remove additional conductive and ferromagnetic materials.

4. The method of claim 1, wherein said first microwave frequency is about 2.45 gigahertz.

5. The method of claim 1, wherein said first power is between about 100 watts and about 300 watts.

6. The method of claim 1, wherein said first power is between about 50 watts and about 2000 watts.

7. The method of claim 1, wherein said first power is selected to maintain a temperature of between about 450° C. and about 600° C. in said carbon nanotube sample.

8. The method of claim 1, wherein said first power is selected to maintain a temperature of about 500° C. in said carbon nanotube sample.

9. The method of claim 1, wherein exposing said carbon nanotube sample to microwave energy comprises exposing said carbon nanotube sample for about 20 minutes.

* * * * *